(12) United States Patent
Wetzel et al.

(10) Patent No.: US 9,229,833 B2
(45) Date of Patent: Jan. 5, 2016

(54) SUCCESSIVE APPROXIMATION RESISTOR DETECTION

(75) Inventors: Randall Wetzel, Scarborough, ME (US); Kenneth P. Snowdon, Falmouth, ME (US); Kenneth O'Brien, Gorham, ME (US)

(73) Assignee: FAIRCHILD SEMICONDUCTOR CORPORATION, San Jose, CA (US)

( * ) Notice: Subject to any disclaimer, the term of this patent is extended or adjusted under 35 U.S.C. 154(b) by 314 days.

(21) Appl. No.: 13/359,006

(22) Filed: Jan. 26, 2012

(65) Prior Publication Data

US 2012/0198183 A1 Aug. 2, 2012

Related U.S. Application Data

(60) Provisional application No. 61/437,255, filed on Jan. 28, 2011.

(51) Int. Cl.
*G01R 27/08* (2006.01)
*G06F 11/30* (2006.01)

(52) U.S. Cl.
CPC ........ *G06F 11/3013* (2013.01); *G06F 11/3051* (2013.01); *G06F 11/3058* (2013.01)

(58) Field of Classification Search
CPC ............ G06F 11/3013; G06F 11/3058; G06F 11/3051; G01R 27/08
USPC .................. 324/691–719; 711/154, E12.001; 710/15–19
See application file for complete search history.

(56) References Cited

U.S. PATENT DOCUMENTS

| | | | |
|---|---|---|---|
| 4,764,750 A * | 8/1988 | Kawada | 341/122 |
| 7,565,458 B2 | 7/2009 | Thijssen et al. | |
| 7,711,870 B2 | 5/2010 | Yoshida et al. | |
| 8,230,126 B2 | 7/2012 | Siulinski | |
| 8,489,782 B2 | 7/2013 | Chadbourne et al. | |
| 8,914,552 B2 | 12/2014 | Chadbourne et al. | |
| 9,060,228 B2 | 6/2015 | Lee et al. | |
| 2005/0268000 A1 * | 12/2005 | Carlson | 710/15 |

(Continued)

FOREIGN PATENT DOCUMENTS

| CN | 101069410 A | 11/2007 |
|---|---|---|
| CN | 101425048 A | 5/2009 |

(Continued)

OTHER PUBLICATIONS

"U.S. Appl. No. 13/584,465, Response filed Jan. 9, 2013 to Non Final Office Action mailed Nov. 15, 2012", 8 pgs.

(Continued)

*Primary Examiner* — Arleen M Vazquez
*Assistant Examiner* — Brent J Andrews
(74) *Attorney, Agent, or Firm* — Schwegman Lundberg & Woessner, P.A.

(57) ABSTRACT

An apparatus comprises a connector configured to receive an electrical contact of an accessory device that is electrically coupled to a resistor of the accessory device, a current source configured to apply a specified current to the resistor to generate a resulting voltage, a comparator configured to receive and compare the resulting voltage to a reference voltage, and a controller configured to store an outcome of the comparison as a bit in a register, to adjust the applied current using the outcome of the comparison, and to determine a resistance value for the resistor using the bit stored in the register.

20 Claims, 2 Drawing Sheets

(56) References Cited

U.S. PATENT DOCUMENTS

| | | | |
|---|---|---|---|
| 2006/0147059 | A1 | 7/2006 | Tang |
| 2007/0082634 | A1* | 4/2007 | Thijssen et al. ............ 455/169.1 |
| 2007/0164759 | A1 | 7/2007 | Bordelon |
| 2008/0150512 | A1* | 6/2008 | Kawano ....................... 323/351 |
| 2008/0164994 | A1 | 7/2008 | Johnson et al. |
| 2008/0318629 | A1 | 12/2008 | Inha et al. |
| 2009/0198841 | A1* | 8/2009 | Yoshida et al. ................. 710/16 |
| 2011/0099298 | A1 | 4/2011 | Chadbourne et al. |
| 2011/0099300 | A1 | 4/2011 | Siulinski |
| 2012/0019309 | A1 | 1/2012 | Turner et al. |
| 2012/0326736 | A1 | 12/2012 | Chadbourne et al. |
| 2013/0156216 | A1 | 6/2013 | Shah et al. |
| 2013/0158919 | A1 | 6/2013 | Shah et al. |
| 2014/0025845 | A1 | 1/2014 | Chadbourne et al. |
| 2014/0038460 | A1 | 2/2014 | Lee |

FOREIGN PATENT DOCUMENTS

| | | |
|---|---|---|
| CN | 101426035 A | 5/2009 |
| CN | 101937717 A | 1/2011 |
| CN | 102056072 A | 5/2011 |
| CN | 102680794 A | 9/2012 |
| CN | 202837404 U | 3/2013 |
| CN | 104699636 A | 6/2015 |
| CN | 104699637 A | 6/2015 |
| DE | 102010049654 A1 | 6/2011 |
| KR | 20110046361 A | 5/2011 |

OTHER PUBLICATIONS

"U.S. Appl. No. 13/584,465, Non Final Office Action mailed Nov. 15, 2012", 8 pgs.

"U.S. Appl. No. 13/584,465, Notice of Allowance mailed Mar. 18, 2013", 7 pgs.

"Chinese Application Serial No. 201220044818.X, Notification to Make Rectification mailed Jul. 17, 2012", 3 pg.

"Chinese Application Serial No. 201220044818.X, Response filed Oct. 8, 2012 to Office Action mailed Jul. 17, 2012", 3 pgs.

"U.S. Appl. No. 12/606,562, Notice of Allowance Mailed Jan. 27, 2012", 7 pgs.

"U.S. Appl. No. 12/606,562, Response to Rule 312 Communication mailed May 29, 2012", 1 pgs.

"U.S. Appl. No. 12/606,562, Response to Rule 312 Communication mailed Jul. 2, 2012", 2 pgs.

"U.S. Appl. No. 12/606,582, Notice of Allowance mailed Apr. 12, 2012", 8 pgs.

"U.S. Appl. No. 12/606,582, Response filed Mar. 6, 2012 to Final Office Action mailed Dec. 8, 2011", 10 pgs.

"U.S. Appl. No. 12/606,562 , Response filed Jan. 3, 2012 to Final Office Action mailed Oct. 28, 2011", 7 pgs.

"U.S. Appl. No. 12/606,562 , Response filed Sep. 13, 2011 to Non Final Office Action mailed Jun. 22, 2011", 9 pgs.

"U.S. Appl. No. 12/606,562, Final Office Action mailed Oct. 28, 2011", 10 pgs.

"U.S. Appl. No. 12/606,562, Non Final Office Action mailed Jun. 22, 2011", 9 pgs.

"U.S. Appl. No. 12/606,582, Final Office Action mailed Dec. 8, 2011", 10 pgs.

"U.S. Appl. No. 12/606,582, Non Final Office Action mailed Jul. 14, 2011", 8 pgs.

"U.S. Appl. No. 12/606,582, Response filed Sep. 28, 2011 to Non Final Office Action mailed Jul. 14, 2011", 10 pgs.

"USB OTG Mechanical Presentation", [Online] Retrieved from the Internet on Jun. 3, 2011 http://www.usb.org/developers/onthego/london/OTG_mechanical.pdf, (Feb. 26, 2002), 27 pgs.

"USB Remote Cable", [Online]. Retrieved from the Internet: <URL: http://chdk.wikia.com/wiki/USB_Remote_Cable>, (Jun. 9, 2009), 4 pgs.

Mehta, Arpit, "Keep Power Consumption in Check with Low-Power Comparators that Autosense Plugged-In Accessories", [Online]. Retrieved from the Internet: <URL: http://www.maxim-ic.com/appnotes.cfm/an_pk/4327>, (Feb. 27, 2009), 6 pgs.

"U.S. Appl. No. 13/915,150, Non Final Office Action mailed Jun. 5, 2014", 12 pgs.

"U.S. Appl. No. 13/941,880, Response filed Jul. 24, 2014 to Non Final Office Action mailed Apr. 24, 2014", 7 pgs.

"U.S. Appl. No. 13/941,889, Notice of Allowance mailed Aug. 20, 2014", 7 pgs.

"Chinese Application Serial No. 201210031072.3, Office Action mailed May 26, 2014", 7 pgs.

"U.S. Appl. No. 13/915,150, Advisory Action mailed Jan. 7, 2015", 3 pgs.

"U.S. Appl. No. 13/915,150, Examiner Interview Summary mailed Dec. 15, 2014", 3 pgs.

"U.S. Appl. No. 13/915,150, Final Office Action mailed Oct. 29, 2014", 13 pgs.

"U.S. Appl. No. 13/915,150, Response filed Jan. 29, 2015 to Final Office Action mailed Oct. 29, 2014", 10 pgs.

"U.S. Appl. No. 13/915,150, Response filed Aug. 27, 2014 to Non Final Office Action mailed Jun. 5, 2014", 9 pgs.

"U.S. Appl. No. 13/915,150, Response filed Dec. 12, 2014 to Final Office Action mailed Oct. 29, 2014", 10 pgs.

"U.S. Appl. No. 13/941,889, Preliminary Amendment filed Oct. 3, 2013", 7 pgs.

"Chinese Application Serial No. 201010526298.1, Office Action mailed Sep. 30, 2014", 5 pgs.

"Chinese Application Serial No. 201010526298.1, Response filed Jun. 10, 2014", w/English Claims, 12 pgs.

"Chinese Application Serial No. 201010526298.1, Response filed Nov. 4, 2014 to Office Action mailed Sep. 30, 2014", 19 pgs.

"U.S. Appl. No. 13/915,150, Notice of Allowance mailed Feb. 23, 2015", 15 pgs.

"U.S. Appl. No. 13/941,889, Non Final Office Action mailed Apr. 24, 2014", 7 pgs.

"Chinese Application Serial No. 201010526298.1, Office Action mailed Apr. 3, 2014", w/English Translation, 11 pgs.

"Chinese Application Serial No. 201010526298.1, Office Action mailed Sep. 4, 2013", 10 pgs.

"Chinese Application Serial No. 201010526298.1, Response filed Jan. 14, 2014 to Office Action mailed Sep. 4, 2013", w/English Claims, 21 pgs.

"Chinese Application Serial No. 201210031072.3, Office Action mailed Nov. 25, 2013", 8 pgs.

"Chinese Application Serial No. 201210031072.3, Response filed Apr. 10, 2014 to Office Action mailed Nov. 25, 2013", 13 pgs.

* cited by examiner

SUCCESSIVE APPROXIMATION RESISTOR DETECTION

CLAIM OF PRIORITY

This application claims the benefit of priority under 35 U.S.C. §119(e) to Wetzel et al., U.S. Provisional Application No. 61/437,255, entitled "SUCCESSIVE APPROXIMATION RESISTOR DETECTION," filed on Jan. 28, 2011, which is hereby incorporated by reference in its entirety.

BACKGROUND

Many types of electronic devices are available for providing management of personal information and for providing personal media entertainment. Some of these devices play audio media and video media such as slide shows, music, movies, and other video programs. Examples include a personal computer, a personal data assistant, an MP3 player, and a mobile or cellular telephone. Users may want different device capabilities based on the type of media involved and may want to mix and match accessories with the media players. Using or activating the accessories may require a basic level of sophistication on the part of the user to determine device compatibility and to get different devices to interact.

OVERVIEW

This document discusses, among other things, systems and methods for detecting resistor values of accessories or other devices. In an example, an apparatus can include a current source configured to apply a specified current to a resistor of an accessory device to generate a resulting voltage, a comparator configured to receive and compare the resulting voltage to a reference voltage, and a controller configured to store an outcome of the comparison as a bit in a register, to adjust the applied current using the outcome of the comparison, and to determine a resistance value for the resistor using the bit stored in the register.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
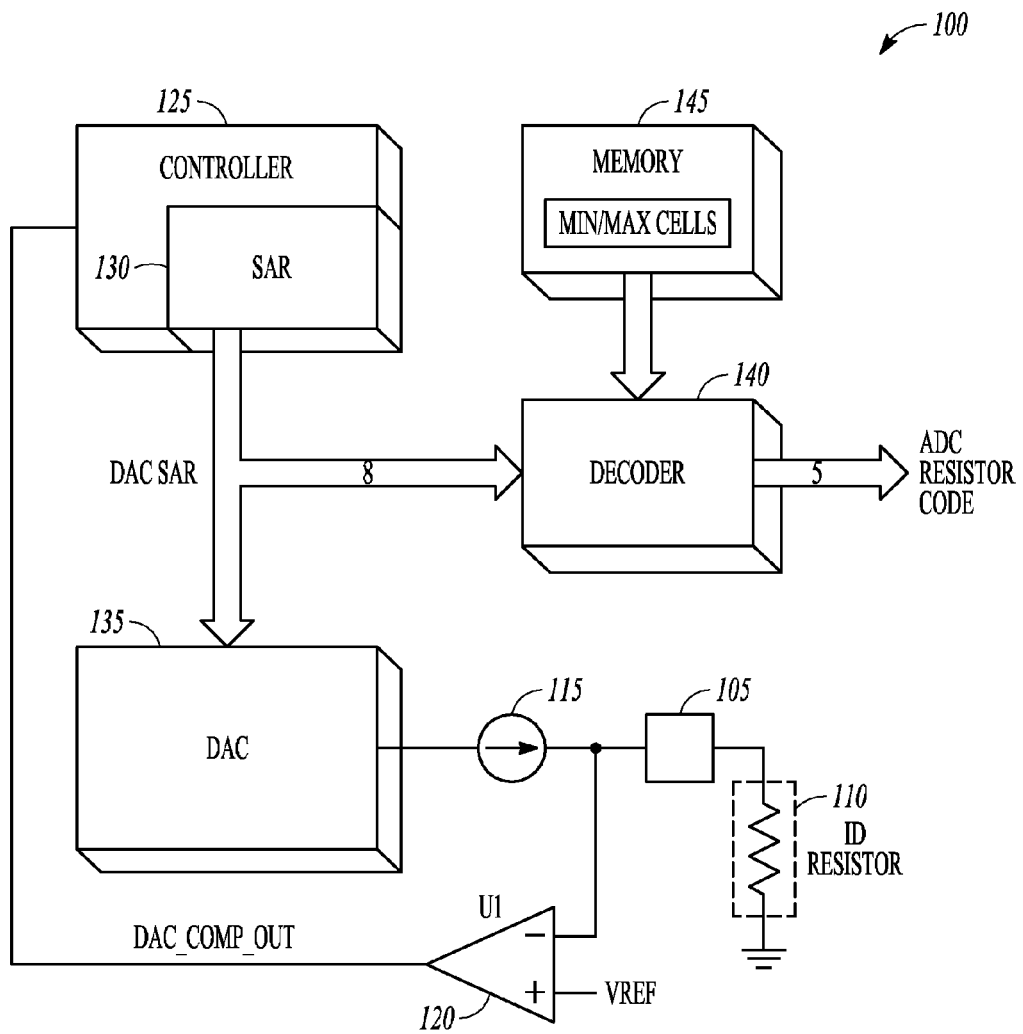
FIG. 1 illustrates generally an example of a device configured to identify a resistance value of an accessory or other device.

In certain examples, mobile devices, such as mobile phones or other mobile devices, use distinct resistor values to identify the accessory or type of accessory being attached at an input, such as a USB port, an audio jack input, an iPhone® 30-pin connector, etc. The present inventors have recognized, among other things, a system and method configured to provide flexible resistor detection of accessories or other devices. Examples of such accessories include, among other things, headphones, a microphone, or an audio visual (A/V) cable.

In an example, a successive approximation algorithm can be used to detect the resistor value (e.g., on a connector pin of an accessory device or other device). The successive approximation algorithm can sequentially apply a binary weighted set of currents to the resistor of the accessory or other device and the resultant voltage can be compared to a reference. After a specified number (e.g., 8) of sequentially applied currents and compared voltages, the binary value of the detected resistor can be held in a register.

In an example, a programmable detection delay can be provided between the sequentially applied currents, for instance, to adjust for settling time as each current is sourced. The programmable detection delay can be adjusted for tradeoffs between accurate ID detection (e.g., using a larger delay) and reporting speeds. Further, the successive approximation algorithm, using a programmable minimum/maximum number of analog-to-digital converter (ADC) values for the resistor values, can provide for the detection of a large number of application-specific IDs.

Existing methods for resistor detection generate one or more predefined currents based on one or more known resistor values and then apply the predefined currents to an ID resistor and compare the voltage produced to a reference. However, the existing methods are inflexible to resistor changes, and have no way of reporting non-standard resistors to the system. Further, the reporting speed of existing methods can vary by a great amount depending on the detected resistor value (e.g., depending on the position of the correct current in the set of predefined currents). For example, for 32 known resistor values, an existing method can generate 32 predefined currents. Accordingly, the time for detection of the resistor can vary from 1 to 32 time periods, depending on the position of the correct current in the set of predefined currents.

In contrast, the successive approximation algorithm disclosed herein can allow for standard or nonstandard resistor values to be accurately detected and reported in a more predictable amount of time. This successive approximation resistor algorithm can determine one of $2^X$ resistance values as the resistance value for the resistor of the accessory device within X time periods (X being a positive integer). In certain examples, the successive approximation resistor algorithm provides for the detection of up to 256 distinct resistor values in 8 time periods. Software can then determine what course of action should be taken depending on the detected resistor value.

FIG. 1 illustrates generally an example of a device 100 configured to identify a resistance value of an accessory or other device. In some examples, the device 100 is included in a mobile electronic device. In some examples, the device 100 is included in a mobile or cellular telephone. The device 100 can include a connector 105 configured to receive an electrical contact of an accessory device. The electrical contact can be electrically coupled to a resistor 110 of the accessory device. In an example, the accessory or other device can include an ID pin coupled to an identification (ID) resistor. In certain examples, the connector 105 can include an ID connection of a universal serial bus (USB) or mini-USB. In certain examples, the connector 105 can include a conducting terminal of an audio or video jack plug (e.g., a conducting terminal of a "TRS" connector, standing for tip, ring and sleeve conducting terminals, or a TRRS connector).

The device 100 can include a current source 115 that applies a specified current to the resistor 110 to generate a resulting voltage, and a comparator 120 that receives the resulting voltage and compares the resulting voltage to a reference voltage ($V_{REF}$).

The device can further include a controller 125. The controller 125 can be an application specific integrated circuit (ASIC) or a processor such as a microprocessor executing instructions in software modules or firmware modules. In some examples, the control circuit is a sequencer. A sequencer can refer to a state machine or other circuit that sequentially steps through a fixed series of steps to perform one or more functions. The steps are typically implemented in hardware or firmware. The controller 125 can include modules to perform the functions described herein. A module can be any combination of software, firmware, and hardware. The controller 125 can be configured by configuring the software (e.g., programming), firmware, and/or hardware. A module may perform more than one of the functions described.

The controller 125 can include a memory to store an outcome of the comparison by the comparator 120 as a bit in a register. In some examples, the register is a successive approximation register 130. The controller 125 can determine a resistance value for the resistor using the bit stored in the register.

The controller 125 can adjust the current applied to the resistor 110 using the outcome of the comparison. In some examples, the controller 125 adjusts the current of the current source 115 using a digital-to-analog-converter 135 (DAC). Each value of the DAC output changes the value of current applied by the current source 115. For instance, if the DAC is an 8-bit DAC, the DAC and current source 115 can provide $2^8$ or 256 different values of current to the resistor 110. In certain examples, the number of bits in the DAC matches the number of bits in the successive approximation register 130. Values of current are successively applied to the resistor 110 and the results of the comparisons are used to fill the successive approximation register 130. When the process is complete, the value stored in the successive approximation register 130 can be used to represent the resistance value of the resistor 110, or the value stored in the successive approximation register 130 can be provided to a decoder 140 to generate a digital value representing the value of resistance of the resistor 110.

Figure 2:
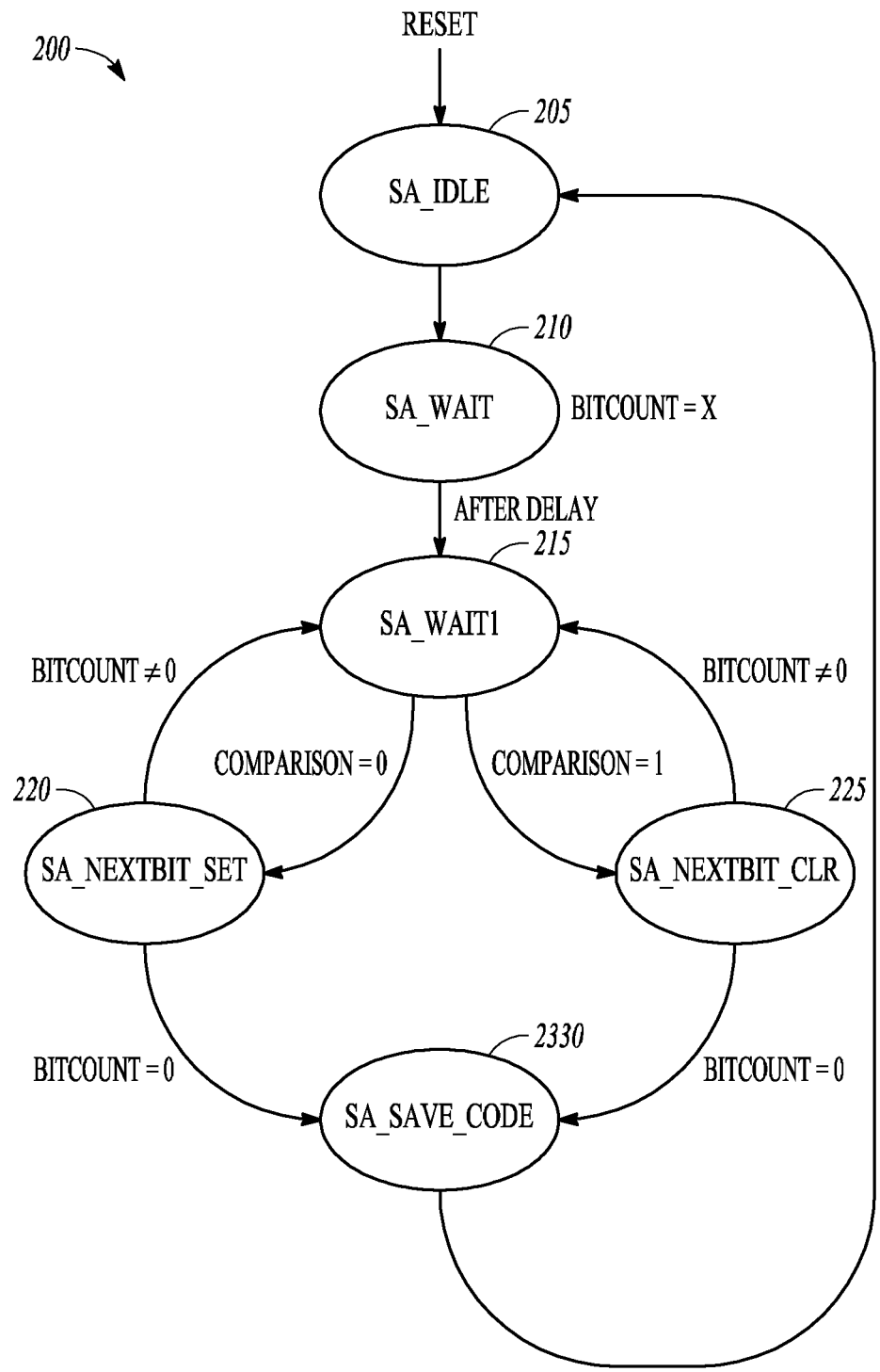
FIG. 2 illustrates generally an example of a process configured to identify a resistance value of an accessory or other device.

FIG. 2 illustrates generally an example of a process 200 configured to identify a resistance value at a connection to an accessory or other device. The process 200 involves successive approximation (SA) and begins in an idle state at block 205. The process 200 may leave the idle state when detecting a non-open circuit at the connector 105 when a device is connected. After waiting a programmable delay time (e.g., two milliseconds or 2 ms) at block 210, a first current can be provided to the accessory device and the process may again wait the delay time at block 215 before proceeding. In some examples, the controller 125 includes a programmable timer circuit to determine the delay. As explained previously herein, the delay allows for settling time as each current is sourced, and the delay can be shortened to shorten the time to determine the resistor value or lengthened if a longer settling provides improved accuracy.

When the first current is applied, the resulting voltage can be compared to the voltage reference. A first bit of a successive approximation register can be determined (e.g., a one or a zero) at blocks 220 and 225 using the results of the comparison. Depending on the results of the comparison, the current can either raised or lowered, and the process of comparing and determining bits can repeat until each bit of the register is set. In the general case, if there are X bits in the successive approximation register 130, the controller 125 initiates X successive comparisons of generated voltages with the reference voltage (X being a positive integer greater than one). The controller 125 stores the outcome in the X bit register and adjusts an output of the current source using the value of the X bit register. The X-bit successive approximation register 130 can be capable of detecting $2^X$ distinct resistor values (including zero resistance). When all the bits of the register are determined, the value of the successive approximation register 130 can be stored at block 230 to save the determined value or code for the ID resistor 110. Note that only X cycles are needed to determine which value, of $2^X$ possible values, is the value of the resistor 110.

In a specific illustrative example, for an 8-bit successive approximation register, the DAC is able to provide $2^8$ (256) distinct current values or current units. The first current applied to the resistor can include $2^7$ (128) current units by setting only the most significant bit (MSB) of the register. This corresponds to the midrange of the DAC. The voltage resulting from the applied current is compared to the reference voltage $V_{REF}$. In certain examples, $V_{REF}$ is generated using a voltage reference circuit that generates a reference voltage of 2.13V to 2.17V. If the voltage generated is higher than $V_{REF}$, the MSB is set to a zero. If the voltage generated is lower than $V_{REF}$, the MSB is set to a zero.

The second current applied to the resistor is determined by setting the MSB-1 bit of the register. If the MSB is a one based on the previous comparison, the current applied is $2^7$ plus $2^6$, or 128+64 or 192 current units. If the MSB of the register is a zero, the current applied is 64 current units. If the voltage generated is higher than $V_{REF}$, the MSB-1 bit is set to a zero. If the voltage generated is lower than $V_{REF}$, the MSB-1 bit is set to a zero. The result of the comparison is one of four possible codes for the two most significant bits of the register; 11, 10, 01, or 00.

The third step is to apply a third current to the resistor. In the example, of an 8-bit register, the third current will differ from the previous current by $2^5$ (32) current units. This process continues with a fourth current can be either raised or lowered $2^4$ (16) current units from the third current depending on the results of the third comparison, and so forth. After the comparison of the least significant bit (LSB), the register 130 in FIG. 1 can provide a code for the resistor (e.g., for an 8-bit register, an 8-bit resistor code, etc.).

Other examples can include logical alternatives of the algorithm are within the scope of the examples. For instance, the current units can be added by the DAC 135 using a zero in the bit register instead of a one in the bit register. In other examples, the successive approximation register can include more or less number of bits, and in certain examples, the number of bits used can depend on the number of discrete resistor values to be detected.

In yet another example, more than one of the 2X values of the X-bit successive approximation register 130 can be used to identify the same ID resistor, e.g., a range of values can be used to identify one ID resistor. The ranges may all of the same size making the conversion from the ranges to the resistor values a linear conversion, such as by using 256 values to encode 64 ID resistors. The decoder 140 converts the value of the successive approximation register 130 to a resistor value or code according to the ranges.

In another example, the ranges used to identify the resistor 110 are not of the same size (e.g., values 6 and 7 correspond to ID resistor R1 and values 8 through 10 correspond to ID resistor R2. This makes the resistor code conversion nonlinear and allows more values or codes to be included in a resistance range where the approximation is less accurate and fewer values in a range where the approximation is more accurate. A DAC circuit often is calibrated using a gross trim and then a finer trim. Using variable ranges may eliminate the need for a finer trim, making the device easier to manufacture; thereby reducing cost. The minimum and maximum of the individual ranges can be stored in a programmable memory 145 (e.g., as a table) allowing the ranges to be programmable. This allows the ranges to be programmed to fit the DAC performance, which provides flexibility to make the device easier to manufacture. The decoder 140 uses the ranges to convert the value of the successive approximation register 130 to a resistor value or code.

When the value or code of the ID resistor 110 is known, this value can be used to identify the accessory device or an operation performable by the accessory device. The accessory device may include more than one resistor to be determined to identify more than one function performable by the accessory device. For instance, the resistor value may identify the accessory device as, among other things, a video display, headset, or microphone. The controller 125 may initiate a device action according to the determined resistance value. The device 100 may include a memory integral to, or separate from, the controller 125 to store a lookup table to associate the device action with the determined resistance value. The lookup table may store device actions indexed by resistance values. For instance, the lookup table may include a resistance value that corresponds to an accessory device that includes at least one of a video display, headset, or microphone, and the device action in the look table indexed by the resistance value is associated with the at least one of the video display, headset, or microphone.

As an illustrative example, the controller 125 may include an audio codec module, and the controller 125 identifies the accessory device as a type of headset (e.g., stereo or mono) according to the determined resistance value and configures the audio codec module, according to the determined resistance value, to provide appropriate audio signals to the accessory device. In another illustrative example, the device 100 may include a video processor, and the controller identifies the accessory device as a video display according to the determined resistance value and configures the video processor, according to the determined resistance value, to provide video information to the accessory device.

The devices and methods described herein allow a host device to detect capabilities of an accessory device to configure the host-accessory system accordingly. Using successive approximation allows many different types of capabilities and devices to be identified while minimizing any delay in determining such functions or capabilities.

Additional Notes and Examples

Example 1 includes subject matter (such as an apparatus) comprising a connector configured to receive an electrical contact of an accessory device that is electrically coupled to a resistor of the accessory device, a current source configured to apply a specified current to the resistor to generate a resulting voltage, a comparator configured to receive and compare the resulting voltage to a reference voltage, and a controller configured to store an outcome of the comparison as a bit in a register, to adjust the applied current using the outcome of the comparison, and to determine a resistance value for the resistor using the bit stored in the register.

In Example 2, the subject matter of claim 1 can optionally include a controller configured to initiate X successive comparisons of generated voltages to the reference voltage, wherein X is a positive integer greater than one, store the outcome in an X bit register, and adjust an output of the current source using the value of the X bit register.

In Example 3, the subject matter of one or any combination of Examples 1 and 2 can optionally include a controller configured to apply X current values to determine one of $2^X$ resistance values as the resistance value for the resistor of the accessory device, where X is a positive integer greater than one.

In Example 4, the subject matter of one or any combination of Examples 1-3 can optionally include a decoder configured to use a range of a plurality of the $2^X$ determinable resistance values to identify the same resistor of the accessory device.

In Example 5, the subject matter of one or any combination of Examples 1-4 can optionally include a controller configured to initiate a device action according to the determined resistance value.

In Example 6, the subject matter of one or any combination of Examples 1-5 can optionally include a memory to store a lookup table to associate the device action with the determined resistance value.

In Example 7, the subject matter of one or any combination of Examples 1-6 can optionally include the determined resistance value identifying the accessory device as at least one of a video display, headset, or microphone, and wherein the device action is associated with the at least one of the video display, headset, or microphone.

In Example 8, the subject matter of one or any combination of Examples 1-7 can optionally include a connector configured to receive an audio or video jack plug of the accessory device.

In Example 9, the subject matter of one or any combination of Examples 1-8 can optionally include a connector that is an identification (ID) connection of a universal serial bus (USB).

Example 10 can include subject matter (such as an apparatus), or can optionally be combined with the subject matter of one or any combination of Examples 1-9 to include subject matter, comprising a first device and a second accessory device. The second accessory device can optionally include an identification resistor. The first device can optionally include a current source configured to apply a specified current to the identification resistor to generate a resulting voltage, a comparator configured to receive and compare the resulting voltage to a reference voltage, and a controller configured to receive and store an outcome of the comparison as a bit in a register, to adjust the applied specified current using the outcome of the comparison, and to determine a resistance value for the identification resistor using the bit stored in the register.

In Example 11, the subject matter of one or any combinations of Examples 1-10 can optionally include a controller configured to initiate X successive comparisons of generated voltages to the reference voltage, wherein X is a positive integer greater than one, store the outcome in an X bit register, and adjust an output of the current source using the value of the X bit register.

In Example 12, the subject matter of one or any combination of Examples 1-11 can optionally include a controller configured to apply X current values to determine one of $2^X$ resistance values as the resistance value for the identification resistor of the accessory device, where X is a positive integer greater than one.

In Example 13, the subject matter of one or any combination of Examples 1-12 can optionally include the first device having a memory to store a lookup table to associate the device action with the determined resistance value, and wherein the controller is configured to initiate a device action according to the determined resistance value.

In Example 14, the subject matter of one or any combination of Examples 1-14 can optionally include the first device being a cellular telephone.

Example 15 can include subject matter (such as a method, a means for performing acts, or a machine-readable medium including instructions that, when performed by the machine, cause the machine to perform acts), or can optionally be combined with the subject matter of one or any combination of Examples 1-14 to include subject matter, comprising applying, using a first device, a specified current to a resistor of a second accessory device to generate a resulting voltage, comparing the resulting voltage to a reference voltage, storing an outcome of the comparison as a bit in a register in the first device, adjusting the specified current using the outcome of the comparison, and determining a resistance value for the resistor using the bit stored in the register.

In Example 16, the subject matter of one or any combination of Examples 1-15 can optionally include storing the outcome of X successive comparisons of generated voltages to the reference voltage in an X bit register, wherein X is a positive integer greater than one, and adjusting the specified current using the value of the X bit register.

In Example 17, the subject matter of one or any combination of Examples 1-16 can optionally include successively applying X current values to determine one of $2^X$ resistance values as the resistance value for the resistor of the accessory device, where X is a positive integer greater than one.

In Example 18, the subject matter of one or any combination of Examples 1-17 can optionally include initiating an action by the first device according to the determined resistance value.

In Example 19, the subject matter of one or any combination of Examples 1-18 can optionally include identifying a function of the second accessory device using the determined resistance value and a lookup table stored in the first device.

In Example 20, the subject matter of one or any combination of Examples 1-19 can optionally include using the determined resistance value to identify the second accessory device as at least one of a video display, headset, or microphone.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, although the examples above have been described relating to PNP devices, one or more examples can be applicable to NPN devices. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus, comprising:
   a current source configured to apply a specified value of current to a resistor of an accessory device to generate a resulting resistor voltage when an electrical connection to the accessory device is detected;
   a comparator configured to receive and compare the resulting resistor voltage to a reference voltage; and
   a controller configured to:
   repetitively set the value of current applied by the current source to the resistor of the accessory device according to bits stored in a register, initiate comparisons of resistor voltages resulting from the applied current to the reference voltage, update the bits of the register according to outcomes of the comparisons, and change the value of the current applied by the current source according to the updated bits of the register; and
   identify a function performable by the accessory device using the bits stored in the register.

2. The apparatus of claim 1, wherein the controller is configured to:
   initiate X successive comparisons of generated voltages to the reference voltage, wherein X is a positive integer greater than one;
   store the outcome in an X bit register; and
   adjust an output of the current source using the value of the X bit register.

3. The apparatus of claim 1, wherein the controller is configured to apply X current values to determine one of $2^X$ resistance values as the resistance value for the resistor of the accessory device, where X is a positive integer greater than one.

4. The apparatus of claim 3, including a decoder configured to use a range of a plurality of the $2^X$ determinable resistance values to identify the resistor of the accessory device.

5. The apparatus of claim 1, wherein the controller is configured to initiate a device action according to the determined resistance value.

6. The apparatus of claim 5, including a memory to store a lookup table to associate the device action with the determined resistance value.

7. The apparatus of claim 5, wherein the determined resistance value identifies the accessory device as at least one of a video display, headset, or microphone, and
wherein the device action is associated with the at least one of the video display, headset, or microphone.

8. The apparatus of claim 1, including a connector configured to receive an electrical contact of the accessory device,
wherein the electrical contact is coupled to the resistor of the accessory device, and
wherein the connector is configured to receive an audio or video jack plug of the accessory device.

9. The apparatus of claim 1, including a connector configured to receive an electrical contact of the accessory device,
wherein the electrical contact is coupled to the resistor of the accessory device, and
wherein the connector is an identification (ID) connection of a universal serial bus.

10. A system comprising:
a first device and a second accessory device, wherein the second accessory device includes an identification resistor, and wherein the first device includes:
a current source configured to apply a specified value of current to the identification resistor to generate a resulting resistor voltage when an electrical connection to the second accessory device is detected;
a comparator configured to receive and compare the resulting resistor voltage to a reference voltage; and
a controller configured to: repetitively set the value of current applied by the current source to the resistor of the accessory device according to bits stored in a register, initiate comparisons of resistor voltages resulting from the applied current to the reference voltage, update the bits of the register according to outcomes of the comparisons change the value of the current applied by the current source according to the updated bits of the register, and to encode a resistance value for the identification resistor using the bits stored in the register.

11. The system of claim 10, wherein the controller is configured to:
initiate X successive comparisons of generated voltages to the reference voltage, wherein X is a positive integer greater than one;
store the outcome in an X bit register; and
adjust an output of the current source using the value of the X bit register.

12. The system of claim 10, wherein the controller is configured to apply X current values to determine one of $2^X$ resistance values as the resistance value for the identification resistor of the accessory device, where X is a positive integer greater than one.

13. The system of claim 10, wherein the first device includes a memory to store a lookup table to associate the device action with the determined resistance value, and
wherein the controller is configured to initiate a device action according to the determined resistance value.

14. The system of claim 10, wherein the first device is a cellular phone.

15. A method comprising:
applying, using a first device, a specified value of current to a resistor of a second accessory device to generate a resulting resistor voltage when detecting an electrical connection between the first device and the second device;
comparing the resulting voltage to a reference resistor voltage;
storing an outcome of the comparison as a bit in a register in the first device;
repetitively setting the value of current applied to the resistor of the second device according to bits stored in the register, comparing the resulting resistor voltages to the reference resistor voltage, updating the bits of the register according to outcomes of the comparisons, and changing the value of the current applied by the current source according to the updated bits of the register; and
identifying a function performable by the second accessory device using the bits stored in the register.

16. The method of claim 15, including:
storing the outcome of X successive comparisons of generated voltages to the reference voltage in an X bit register, wherein X is a positive integer greater than one; and
adjusting the specified current using the value of the X bit register.

17. The method of claim 15, including successively applying X current values to determine one of $2^X$ resistance values as the resistance value for the resistor of the accessory device, where X is a positive integer greater than one.

18. The method of claim 15, including initiating an action by the first device according to the determined resistance value.

19. The method of claim 18, including identifying a function of the second accessory device using the determined resistance value and a lookup table stored in the first device.

20. The method of claim 18, including using the determined resistance value to identify the second accessory device as at least one of a video display, headset, or microphone.

* * * * *